United States Patent
Lee et al.

(10) Patent No.: US 7,834,952 B2
(45) Date of Patent: Nov. 16, 2010

(54) BACKLIGHT UNIT IMPROVED IN LIGHT MIXING FEATURE

(75) Inventors: Hyun Ho Lee, Gyunggi-Do (KR); Hyeong Won Yun, Gyunggi-Do (KR)

(73) Assignee: Samsung LED Co., Ltd., Gyunggi-Do (KR)

( * ) Notice: Subject to any disclaimer, the term of this patent is extended or adjusted under 35 U.S.C. 154(b) by 981 days.

(21) Appl. No.: 11/651,501

(22) Filed: Jan. 10, 2007

(65) Prior Publication Data

US 2007/0159573 A1    Jul. 12, 2007

(30) Foreign Application Priority Data

Jan. 11, 2006    (KR) .................. 10-2006-0003129

(51) Int. Cl.
    *G02F 1/1335*    (2006.01)
(52) U.S. Cl. .......................... 349/62; 349/64
(58) Field of Classification Search ............. 349/61–68
    See application file for complete search history.

(56) References Cited

U.S. PATENT DOCUMENTS

| | | | |
|---|---|---|---|
| 6,964,497 B2* | 11/2005 | Greiner | 362/241 |
| 7,097,317 B2 | 8/2006 | Kim | |
| 2002/0097354 A1 | 7/2002 | Greiner | |
| 2003/0122996 A1* | 7/2003 | Cho | 349/65 |
| 2005/0174802 A1* | 8/2005 | Wu et al. | 362/602 |
| 2006/0203146 A1 | 9/2006 | Bang | |
| 2007/0008740 A1 | 1/2007 | Lee et al. | |
| 2008/0192174 A1 | 8/2008 | Odake et al. | |

FOREIGN PATENT DOCUMENTS

| | | |
|---|---|---|
| CN | 1627153 A | 6/2005 |
| JP | 51-18533 | 2/1976 |
| JP | 61-133502 | 6/1986 |
| JP | 02-183903 | 7/1990 |
| JP | 2002-324409 | 11/2002 |
| JP | 2005-352426 | 12/2005 |
| JP | 2006-244990 | 9/2006 |

OTHER PUBLICATIONS

Chinese Office Action, with English Translation, issued in Chinese Patent Application No. CN 2007-100013853 dated on Apr. 18, 2007.

* cited by examiner

*Primary Examiner*—Dung T. Nguyen
(74) *Attorney, Agent, or Firm*—McDermott Will & Emery LLP (57) ABSTRACT

Light beams are outputted from optical devices and mixed together to obtain uniform white light free from color stains, thereby achieving a backlight unit improved in light mixing feature. In the backlight unit, a surface light source has a reflecting surface with a plurality of optical devices mounted thereon. An optical sheet is disposed in front of the surface light source. A reflecting layer is disposed between the surface light source and the optical sheet and has reflectivity varied by an incident angle of light beams from the optical devices. The backlight unit enables the light beams from the optical devices to be mixed together. The light beams outputted from the optical devices are effectively mixed together by a reflecting layer having reflectively varied by an incident angle of the light beams from the optical devices, thereby achieving uniform white light without color stains.

6 Claims, 8 Drawing Sheets

PRIOR ART
FIG. 1

PRIOR ART

Prior art

FIG. 8a

Comparative example

FIG. 8b

Invention

FIG. 8c

BACKLIGHT UNIT IMPROVED IN LIGHT MIXING FEATURE

CLAIM OF PRIORITY

This application claims the benefit of Korean Patent Application No. 2006-03129 filed on Jan. 11, 2006 in the Korean Intellectual Property Office, the disclosure of which is incorporated herein by reference.

BACKGROUND OF THE INVENTION

1. Field of the Invention

The present invention relates to a liquid crystal display (LCD) backlight unit employing a plurality of optical devices, and more particularly, to a backlight unit improved in light mixing feature, in which light beams outputted from the optical devices are effectively dispersed and mixed together, thereby producing uniform white light free from color blur.

2. Description of the Related Art

A Cold Cathode Fluorescent Lamp (CCFL) has been adopted for a light source of a conventional Liquid Crystal Display (LCD) backlight. The CCFL, which uses a mercury gas, may trigger environmental pollution. Besides, the CCFL has low response rate, low color reproducibility, and inappropriateness for a lighter and smaller LCD panel.

In contrast, a Light Emitting Diode (LED) is environment-friendly, quick to respond with a rate of several nano seconds and effective in video signal stream. Moreover, the LED can be driven impulsively, and can reproduce color by 100% or more and adjust a light amount of red, green and blue LEDs to alter luminance and color temperature arbitrarily. Also, the LED is beneficial for a lighter and smaller LCD panel, thereby actively employed as a backlight source of e.g., the LCD panel.

As described above, the CCFL or LCD backlight directly irradiates light toward the LCD panel from a surface light source which is substantially identical in size with the LCD panel.

Figure 1:
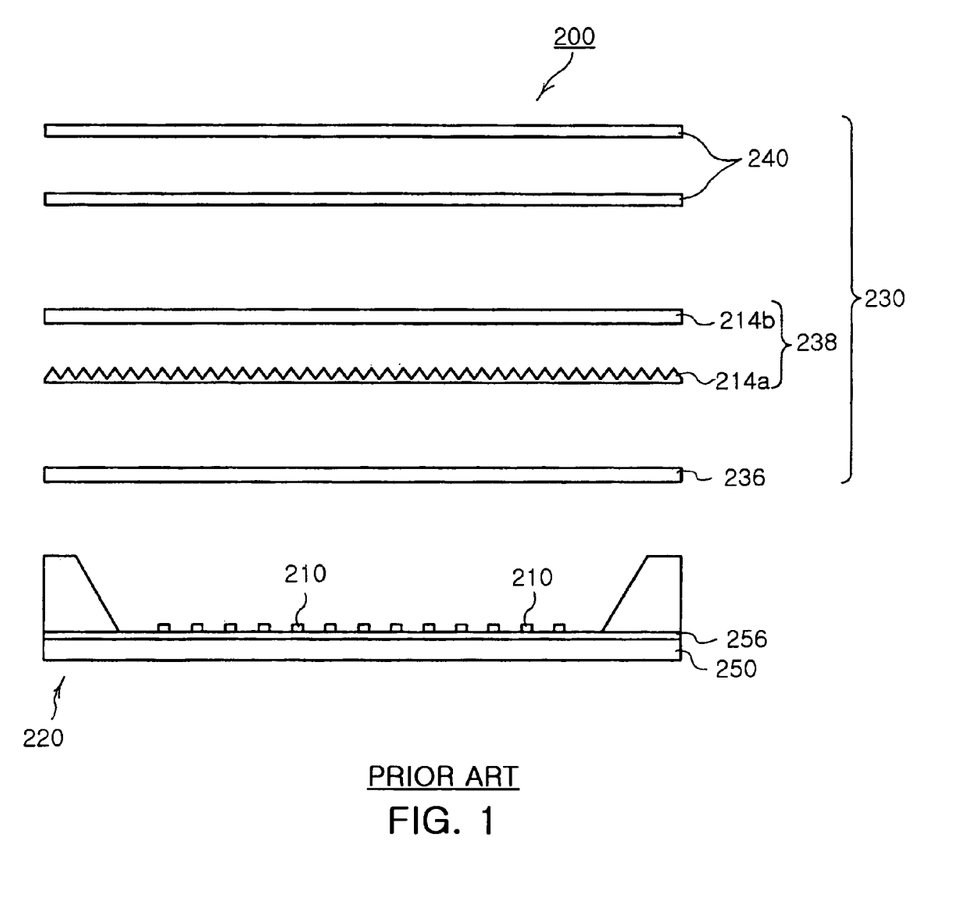
FIG. 1 is an exploded cross-sectional view illustrating a backlight unit according to the prior art.

As shown in FIG. 1, the conventional LCD backlight 200 includes a surface light source 220 and an optical sheet 230. The surface light source 220 has a plurality of optical devices 210 such as green, blue and red LEDs arranged thereon. The optical sheet 230 is disposed over the surface light source 220 to output light beams incident from the surface light source 220 to the outside.

In the conventional LCD backlight 200, the optical sheet 230 disposed over the surface light source 220 includes a diffuser sheet 236 and at least one light collecting sheet 238. The diffuser sheet 236 diffuses the light beams incident from the optical devices 210 uniformly. The light collecting sheet 238 collects the light beams diffused by the diffuser sheet 236 in a direction perpendicular to the plane of the LCD panel.

Furthermore, the conventional LCD backlight unit 200 may further include a protective sheet 240 disposed above the light collecting sheet 238 to protect an underlying optical structure.

The surface light source 220 includes a reflecting layer 256 formed on a substrate 250 to reflect the light beams emitted from the optical devices 210 upward.

Figure 2:
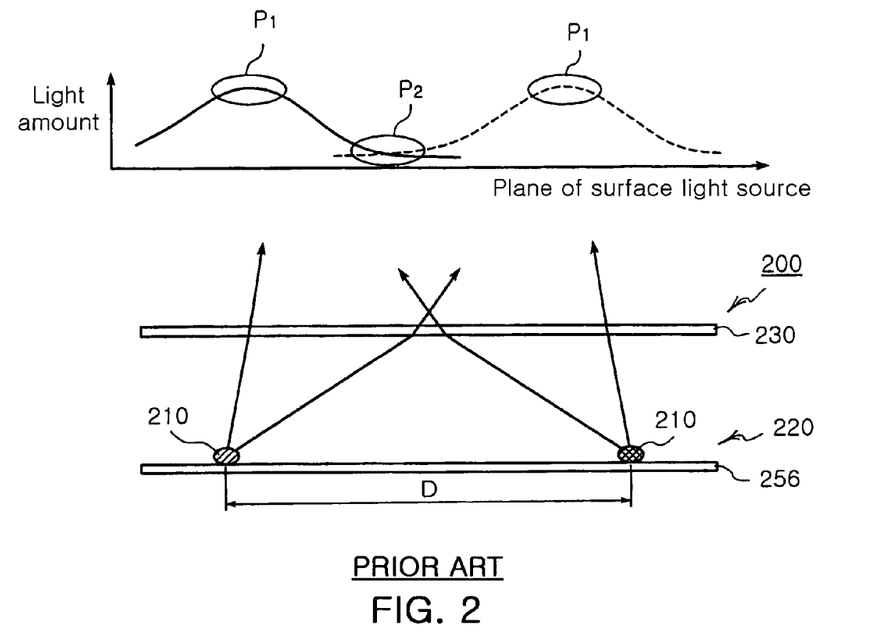
FIG. 2 is an explanatory view illustrating difference in the light amount outputted just over optical devices and that outputted to between the optical devices according to the prior art.

Therefore, as shown in FIG. 2, in order to combine the red, green and blue lights into white light, the conventional LCD backlight 200 adopts the surface light source 220 having the optical devices 210 arranged thereon and the optical sheet 230 fixedly disposed over the surface light source 220.

In the conventional LCD backlight 200, when the light beams emitted from the optical devices 210 of the surface optical source 220 are outputted to the outside through the optical sheet 230, significant difference in the amount of output light is observed between some areas where the optical devices 210 are located and the other areas where the optical devices are not disposed. This resultantly causes color stains.

That is, to gain product competitiveness, the conventional LCD backlight 200 should be competitive in terms of not only costs but also quality. One factor concerns whether to output uniform white light without color blur.

Therefore, to acquire product competitiveness in terms of costs, the conventional LCD backlight 200 should be preferably equipped with a fewer number of the optical devices 210 per unit area, which accordingly widens a pitch D between the optical devices 210.

With the increase in the pitch between the optical devices 210 as described above, the light amount outputted to the areas between the optical devices 210 as shown in FIG. 2 is significantly smaller than that outputted to the areas just over the optical devices 210. Accordingly, the surface light source 220 of the conventional LCD backlight fails to output uniform white light due to color stains.

That is, in the conventional LCD backlight 200, a majority of the light beams outputted from the optical devices 210 directly transmit the optical sheet 230 to be output to outside.

The optical sheet 230 disperses the light beams from the optical devices 210 and mixes them together, however, with negligible effects.

As a result, as shown in a graph of FIG. 2, in the conventional LCD backlight 200, there exists a great difference in the light amount outputted to the areas just over P1 the optical devices 210 and that outputted to the areas between P2 the optical devices, thereby not obtaining uniform white light owing to color blur.

SUMMARY OF THE INVENTION

The present invention has been made to solve the foregoing problems of the prior art and therefore an aspect of the present invention is to provide a backlight unit improved in light mixing feature, in which light beams outputted from optical devices are effectively dispersed and mixed together, thereby achieving uniform white light free from color stains.

Another aspect of the invention is to provide a backlight unit improved in light mixing feature, which produces uniform white light without color stains to thereby elevate quality of finished products remarkably and enhance product competitiveness.

According to an aspect of the invention, the invention provides a backlight unit improved in light mixing feature. The backlight unit includes a surface light source having a reflecting surface with a plurality of optical devices mounted thereon; an optical sheet disposed in front of the surface light source; and a reflecting layer disposed between the surface light source and the optical sheet and having reflectivity varied by an incident angle of light beams from the optical devices, whereby the light beams from the optical devices are mixed together.

Preferably, the optical sheet comprises Poly Methylmethacrylate (PMMA), and the reflecting layer is coated underneath the optical sheet.

Preferably, the backlight unit further includes a plurality of covers each made of a transparent material and disposed over each of the optical devices, wherein the reflecting layer is coated underneath the covers.

Preferably, the covers define horizontal top surfaces, and the reflecting layer is coated underneath the top surfaces.

Preferably, the reflecting layer is adapted to reflect the light beams having a smaller incident angle and transmit the light beams having a greater incident angle.

Preferably, the reflecting layer reflects 90% and transmits 10% of the light beams incident from the optical devices at an angle of 0°, reflects 30% and transmits 70% of the light beams incident at an angle of 60°, and reflects 5% and transmits 95% of the light beams incident at an angle of 90°.

BRIEF DESCRIPTION OF THE DRAWINGS

The above and other objects, features and other advantages of the present invention will be more clearly understood from the following detailed description taken in conjunction with the accompanying drawings, in which:

FIGS. 8a to 8c illustrate results obtained from examples of the backlight units, in which

DETAILED DESCRIPTION OF THE PREFERRED EMBODIMENT

Exemplary embodiments of the present invention will now be described in detail with reference to the accompanying drawings.

Figure 3:
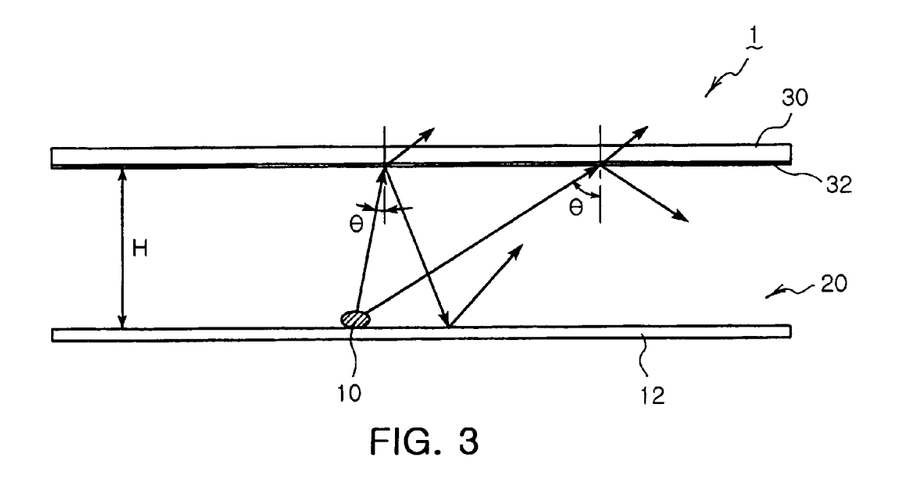
FIG. 3 is a cross-sectional view illustrating a backlight unit improved in light mixing feature according to the invention.

As shown in FIG. 3, a backlight unit 1 improved in light mixing feature according to the invention includes a surface light source 12 having a reflecting surface 12 with a plurality of optical devices 10 mounted thereon.

The surface light source 20 has the reflecting surface 12 formed on the rear side thereof opposite to the front side where the optical devices 10 are mounted. The reflecting surface 12 reflects light beams outputted from the optical device 10 in a forward direction.

Here, the optical devices 10 are exemplified by not only LED devices but also devices such as lamps.

The backlight unit 1 improved in light mixing feature according to the invention includes an optical sheet 30 disposed in front of the surface light source 20. The optical sheet 30 is preferably made of Poly Methylmethacrylate (PMMA), and the reflecting layer 32 is coated underneath the optical sheet 30.

The reflecting layer 32 is disposed between the surface light source 20 and the optical sheet 30 to reflect the light beams having a smaller incident angle θ and transmit the light beams having a greater incident angle θ.

Figure 4:
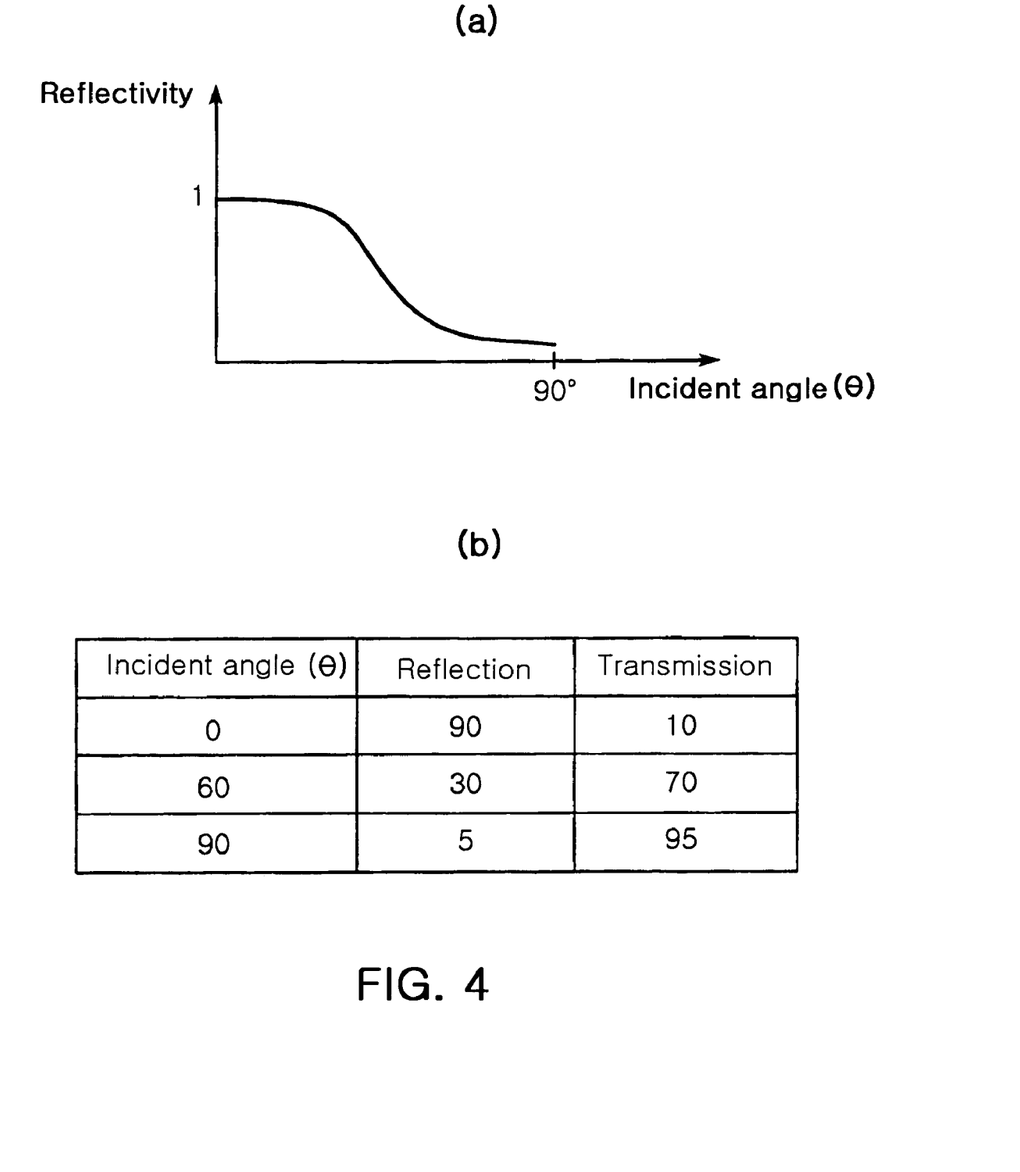
FIG. 4 illustrates characteristics of a reflecting layer disposed in the backlight unit improved in light mixing feature, in which (a) is a graph comparing an incident angle with reflectivity, and (b) is a table demonstrating reflectivity and transmissibility in accordance with an incident angle.

Such a reflecting layer 32 is illustrated in FIGS. 3 and 4.

That is, the light beams emitted from the optical devices 10 enters, at a certain incident angle θ, the reflecting layer 32 disposed in front thereof. The incident angle θ is formed by the light beams outputted from the optical devices 10 with respect to a direction perpendicular to the plane of the reflecting layer 32.

The incident angle θ of the light beams from the optical devices 10 varies reflectivity of the reflecting layer 32.

As shown in FIG. 4, a smaller incident angle θ, i.e., a closer proximity to a direction perpendicular to the plane of the reflecting layer 32 increases reflectivity and decreases transmissibility of the reflecting layer 32. On the other hand, a greater incident angle θ, i.e., a closer proximity to the plane of the reflecting layer 32 decreases reflectivity and increases transmissibility of the reflecting layer 32.

For example, according to the invention, preferably, the reflecting layer 32 reflects 90% and transmits 10% of the light beams incident from the optical devices 10 at an angle of 0°, reflects 30% and transmits 70% of the light beams incident at an angle of 60%, and reflects 5% and transmits 95% of the light beams incident at an angle of 90°.

The reflecting layer 32 having reflectivity varied by an incident angle θ very effectively serves to mix the light beams from the optical devices 10 together, thereby diminishing color stains.

That is, as shown in FIG. 3, the light beams which partially transmit the reflecting layer 32 and are reflected from the reflecting layer 32 due to a small incident angle θ propagate back to the reflecting surface 12 of the surface light source 20 to re-enter the reflecting layer 32. Here, the incident angle θ formed is greater than the initial incident angle.

Accordingly, the light beams re-entering the reflecting layer 32 at an incident angle θ transmit the reflecting layer 32 at a greater amount, with the rest reflected again. The light beams reflected second time travel back to the reflecting surface 12 and are reflected by reflecting surface 12 third time to enter the reflecting layer 32 again.

Therefore, the light beams reflected third time have a much bigger incident angle θ than that of the light beams reflected second time. A considerable proportion of the light beams transmit the reflecting layer 32 due to a greater incident angle θ, and the rest are partially reflected by the reflecting surface 12. Through this process, the light beams emitted from one of the optical devices 10 is added up to the light beams from the adjacent optical device 10 to produce uniform white light.

Figure 5:
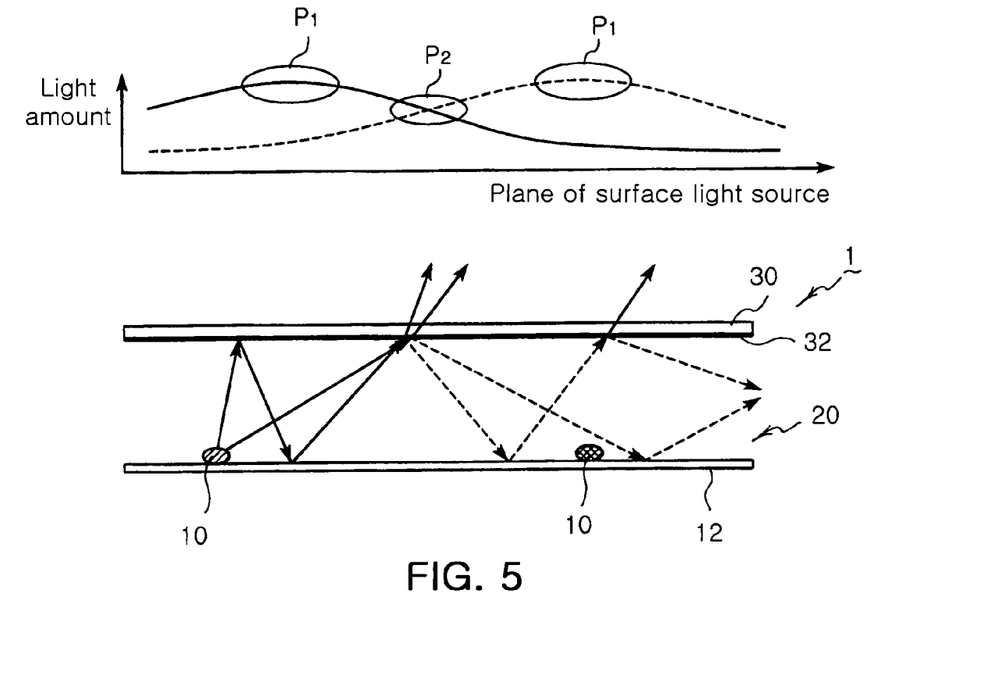
FIG. 5 is an explanatory view illustrating a smaller difference in the light amount outputted just over the optical devices and that outputted to between the optical devices according to the invention.

In consequence, as shown in FIG. 5, in the backlight unit 1 improved in light mixing feature, the light amount outputted to the areas between the optical devices 10 is substantially the same as or differs merely by a very minute amount from that outputted to the areas P1 just over the optical devices 10. This as a result reduces color blur and leads to uniform white light.

Figure 6:
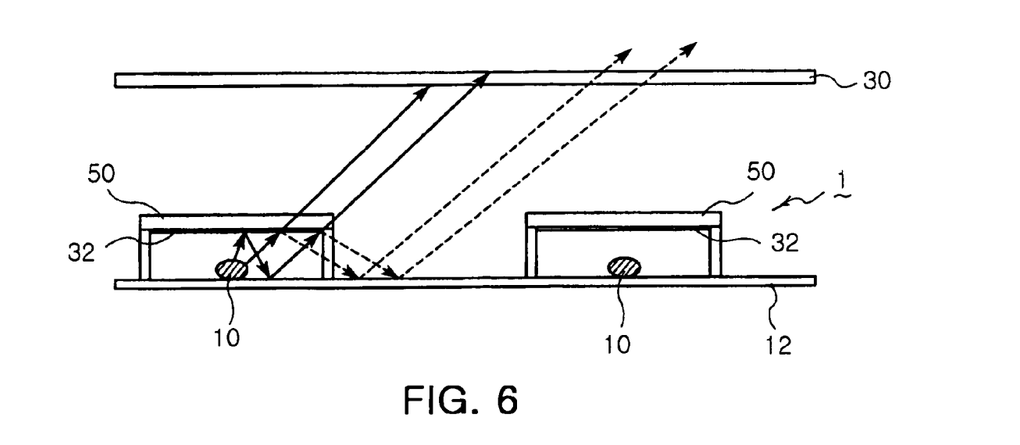
FIG. 6 is a cross-sectional view illustrating a backlight unit improved in light mixing feature according to a modified embodiment of the invention.

FIG. 6 illustrates a backlight unit 1 improved in light mixing feature according to a modified embodiment of the invention.

The backlight unit 1 of the invention further includes a plurality of covers 50 each made of a transparent material and disposed over each of the optical devices 10. Here, the reflecting layer 32 is coated underneath the covers 50.

Each of the covers 50 is disposed over each of the optical devices 10, and made of a transparent material to enable transmission of light beams from the optical devices 10. The covers 50 define horizontal top surfaces, and the reflecting layer 32 is coated underneath the top surfaces.

Here, the covers 50 are disposed separate from the optical sheet 30 and the reflecting layer 32 is formed underneath the covers 50. This structure ensures the same effects explained hereinabove in relation to the structure of FIG. 3.

That is, the light beams outputted from the optical devices 10 at a small incident angle θ partially transmit the reflecting layer 32, while the rest propagate back to the reflecting surface 12 from the reflecting layer 32 to re-enter the reflecting layer 32. Then these light beams partially transmit the reflecting layer 32 and the rest are reflected again.

The light beams reflected second time travel back to the reflecting surface 12, and are reflected by the reflecting surface 12 third time to be outputted toward the optical sheet 30 through the covers 50 made of the transparent material.

Therefore, as shown in FIG. 5, in the backlight unit 1 improved in light mixing feature according to the invention, the light amount outputted to the areas between P2 the optical devices 10 is substantially the same as or differs merely by a very minute amount from that outputted to the areas P1 just over the optical devices 10. As a result, the backlight unit 1 of the invention produces uniform white light with less color blur.

To identify the effects of the invention more specifically, some examples were compared.

The inventive example and the conventional example were compared via computer simulation using Ray Tracing Software (SPEOS).

The conventional example compared with the inventive example had the reflecting layer 32 removed from the structure of FIG. 3. The reflecting surface 12 with 100% reflectivity was formed on the surface light source 20 having the optical devices 10 mounted thereon. The height from the reflecting surface 12 to the optical sheet 30 was 30 mm.

Here, the optical sheet 30 was made of Poly Methylmethacrylate (PMMA) sheet having a thickness of 2 mm. The optical sheet 30 had a reflectivity of 20%, a transmissibility of 70%, and an absorption ratio of 10%.

Figure 7:
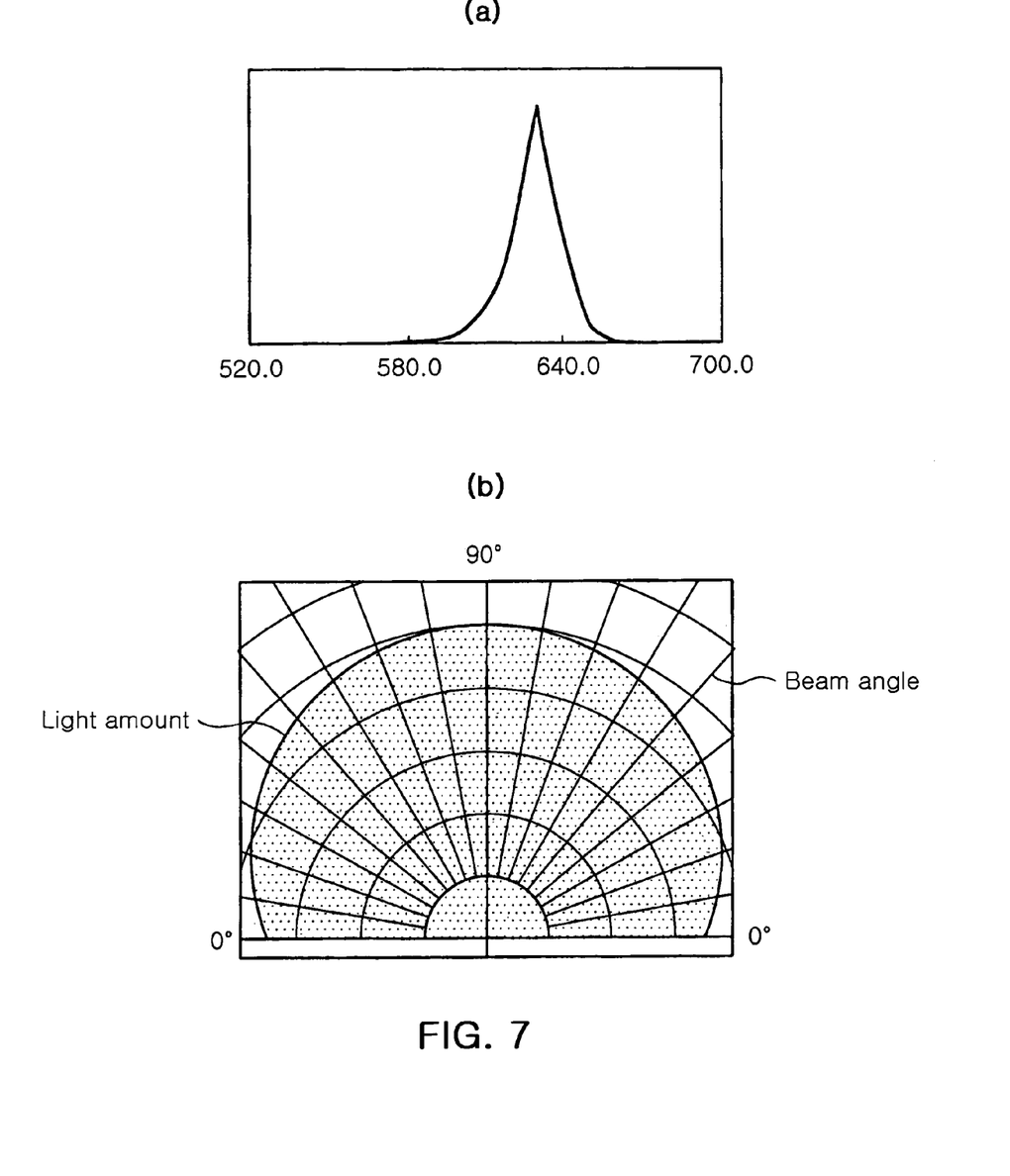
FIG. 7 illustrates characteristics of the optical devices used in an example of the backlight unit improved in light mixing feature according to the invention, in which (a) is a graph illustrating a wavelength, and (b) is a graph illustrating a light amount profile in accordance with a beam angle.

Moreover, the optical devices 10 adopted LED devices that each had a specific wavelength as shown in FIG. 7a and a beam angle profile (light amount per beam angle) as shown in FIG. 7b.

The reflecting layer 32 of the inventive example was coated underneath the optical sheet 30. The reflecting layer 32 had reflectivity varied by an incident angle θ of the light beams. The reflecting layer 32 reflected 90% and transmitted 10% of the light beams incident from the optical devices at an angle θ of 0°, reflected 30% and transmitted 70% of the light beams at an angle of 60°, and reflected 5% and transmitted 95% of the light beams at an angle of 90°.

In the comparative example, the reflecting layer 32 was formed underneath the optical sheet 30 to have reflectivity fixed regardless of the incident angle of the light beams. This reflecting layer with fixed reflectivity reflected 85% and transmitted 15% of the light beams incident.

Figure 8A:
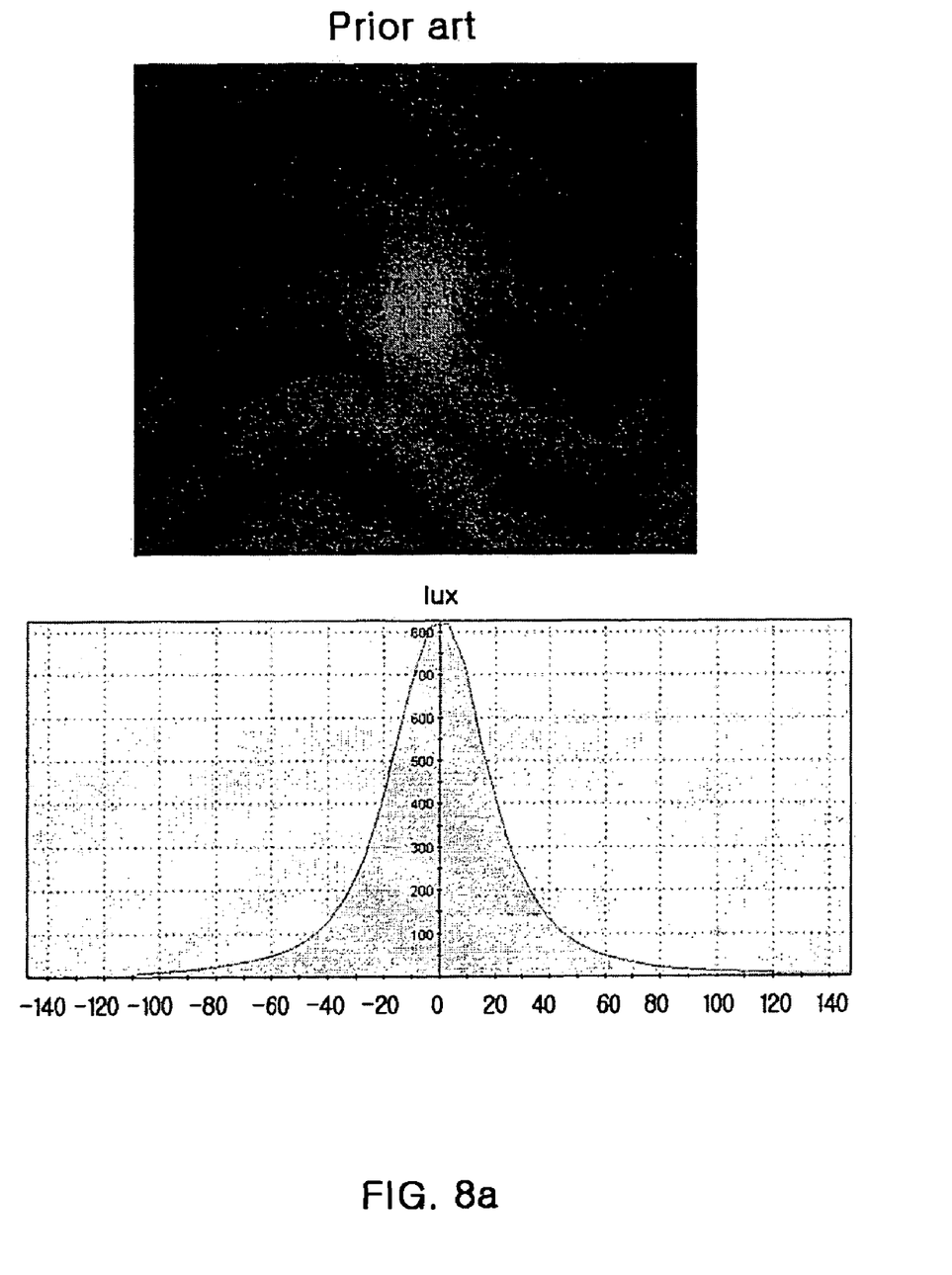
FIG. 8a is the picture and graph obtained according to a conventional example.
Figure 8B:
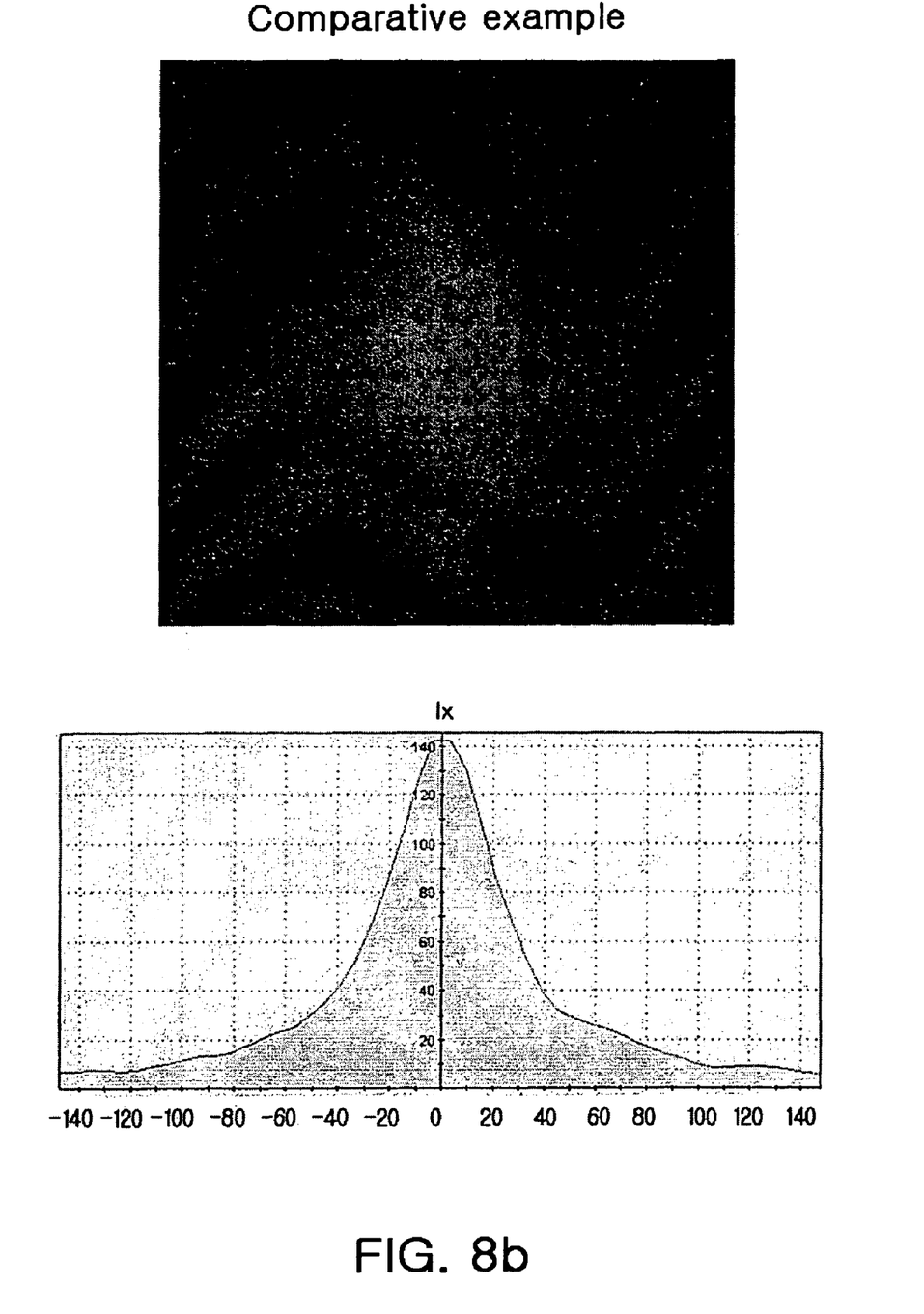
FIG. 8b is the picture and graph illustrating a comparative example.
Figure 8C:
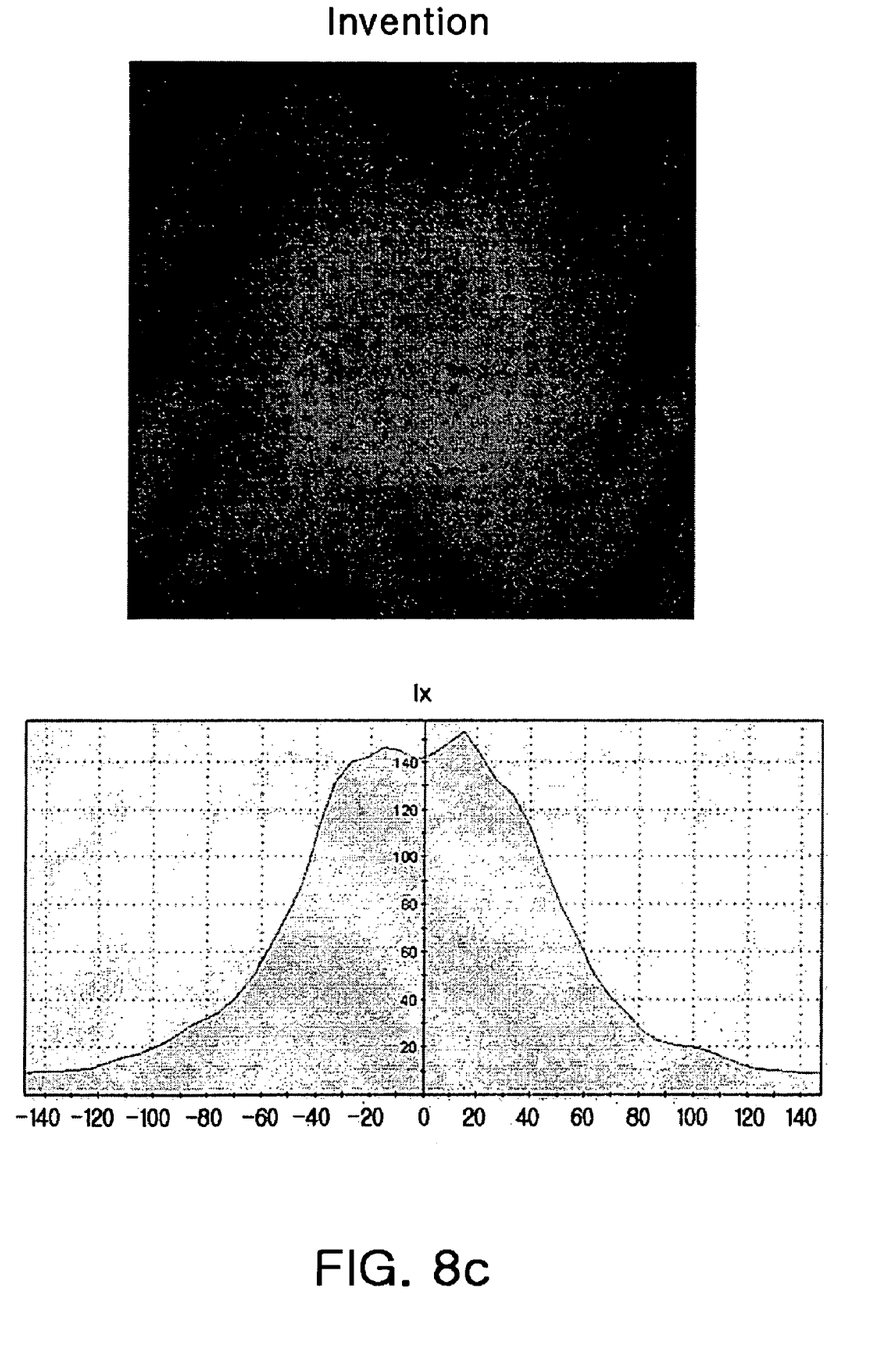
FIG. 8c is the picture and graph obtained from an inventive example.

FIG. 8 illustrates the results.

FIG. 8a is the picture and graph illustrating the conventional optical device structure without the reflecting layer. The light amount was concentrated just over the optical devices 10 and a small light amount was outputted to between the optical devices 10. This caused color stains, thus failing to obtain uniform white light.

FIG. 8b is the picture and graph illustrating the optical device structure having the reflecting layer 32 with fixed reflectivity which reflects 85% and transmits 15% of the light beams incident. Here the light amount just over the optical devices 10 was somewhat dispersed between the optical devices 10. Thus, the light amount outputted just over the optical devices 10 exhibited more moderate difference from that outputted to between the optical devices 10. This still caused color stains, thereby failing to produce uniform white light.

FIG. 8c is the picture and graph illustrating the optical device structure according to the invention. The light amount outputted just over the optical devices 10 was greatly dispersed between the optical devices 10. Thus the light amount outputted just over the optical devices 10 showed much less difference from that outputted to between the optical devices 10. This as a result enabled uniform white light almost fee from color blur.

As set forth above, according to exemplary embodiments of the invention, light beams outputted from optical devices are effectively dispersed and mixed together by a reflecting layer which has reflectivity varied by an incident angle thereof. This produces uniform white light free from color blur.

Also, the invention achieves uniform white light without color stains on a surface light source. This noticeably enhances quality of the finished backlight unit and significantly boosts product competitiveness in terms of cost and quality.

While the present invention has been shown and described in connection with the preferred embodiments, it will be apparent to those skilled in the art that modifications and variations can be made without departing from the spirit and scope of the invention as defined by the appended claims.

What is claimed is:

1. A backlight unit improved in light mixing feature comprising:
    a surface light source having a reflecting surface with a plurality of optical devices mounted thereon;
    an optical sheet disposed in front of the surface light source; and
    a reflecting layer disposed between the surface light source and the optical sheet and having reflectivity varied by an incident angle of light beams from the optical devices,
    wherein the reflecting layer is adapted to reflect the light beams having a smaller incident angle and transmit the light beams having a greater incident angle,
    whereby the light beams from the optical devices are mixed together.

2. The backlight unit according to claim 1, wherein the optical sheet comprises Poly Methylmethacrylate (PMMA), and the reflecting layer is coated underneath the optical sheet.

3. The backlight unit according to claim 1, further comprising a plurality of covers each made of a transparent material and disposed over each of the optical devices,
    wherein the reflecting layer is coated underneath the covers.

4. The backlight unit according to claim 3, wherein the covers define horizontal top surfaces, and the reflecting layer is coated underneath the top surfaces.

5. The backlight unit according to claim 1, wherein the reflecting layer reflects 90% and transmits 10% of the light beams incident from the optical devices at an angle of 0°, reflects 30% and transmits 70% of the light beams incident at an angle of 60°, and reflects 5% and transmits 95% of the light beams incident at an angle of 90°.

6. A backlight unit improved in light mixing feature comprising:
- a surface light source having a reflecting surface with a plurality of optical devices mounted thereon;
- an optical sheet disposed in front of the surface light source; and
- a reflecting layer disposed between the surface light source and the optical sheet and having reflectivity varied by an incident angle of light beams from the optical devices,
- wherein the optical sheet comprises Poly Methylmethacrylate (PMMA), and the reflecting layer is coated underneath the optical sheet,
- whereby the light beams from the optical devices are mixed together.

* * * * *